US012800026B2

(12) United States Patent
Heidl et al.

(10) Patent No.: US 12,800,026 B2
(45) Date of Patent: Nov. 17, 2026

(54) METHOD FOR CONTROLLING A LONGITUDINAL ACCELERATION DURING AND ASSISTING OPERATION OF A DRIVER ASSISTANCE SYSTEM IN A MOTOR VEHICLE, CONTROLLER UNIT AND MOTOR VEHICLE HAVING SUCH A CONTROLLER UNIT

(71) Applicant: Bayerische Motoren Werke Aktiengesellschaft, Munich (DE)

(72) Inventors: Christian Heidl, Garching (DE); Thomas Spichtinger, Burglengenfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 19/123,466

(22) PCT Filed: Oct. 23, 2023

(86) PCT No.: PCT/EP2023/079394
§ 371 (c)(1),
(2) Date: Apr. 23, 2025

(87) PCT Pub. No.: WO2024/088924
PCT Pub. Date: May 2, 2024

(65) Prior Publication Data

US 2026/0146669 A1 May 28, 2026

(30) Foreign Application Priority Data

Oct. 26, 2022 (DE) ..................... 10 2022 128 356.9

(51) Int. Cl.
*F16H 61/04* (2006.01)
*F16H 59/14* (2006.01)
(Continued)

(52) U.S. Cl.
CPC ......... *F16H 61/0437* (2013.01); *F16H 59/14* (2013.01); *F16H 61/0403* (2013.01); *F16H 61/08* (2013.01)

(58) Field of Classification Search
CPC .. F16H 61/0437; F16H 59/14; F16H 61/0403; F16H 61/08
See application file for complete search history.

(56) References Cited

U.S. PATENT DOCUMENTS 5,752,211 A * 5/1998 Takasaki ............ B60K 23/0808 701/88
2005/0171669 A1 8/2005 Sato
(Continued)

FOREIGN PATENT DOCUMENTS

DE 199 16 655 A1 11/2000
DE 10 2005 004 830 A1 9/2005
(Continued)

OTHER PUBLICATIONS

International Search Report (PCT/ISA/210) issued in PCT Application No. PCT/EP2023/079394 dated Jan. 24, 2024 with English translation (6 pages).
(Continued)

*Primary Examiner* — Tisha D Lewis
(74) *Attorney, Agent, or Firm* — Crowell & Moring LLP

(57) ABSTRACT

A method for controlling an acceleration during an assisting operation of a driver assistance system in a motor vehicle equipped with an automatic gear stage shifting transmission may include detecting a shift request signal characterizing an impending gear stage shift, as a result of which a shift starting time is specified and a continuous time value is provided to an alignment function. At the shift starting time an actual current wheel torque value is detected and a target wheel torque maximum value and a target wheel torque minimum value are formed. From the target wheel torque
(Continued)

value and the target wheel torque minimum value, a torque difference value is formed, which is continuously reduced by means of the alignment function depending on the time value over an alignment duration up to a specified alignment time until the torque difference value at the alignment time is zero.

10 Claims, 2 Drawing Sheets

(51) Int. Cl.
*F16H 61/08* (2006.01)
*F16H 63/50* (2006.01)

(56) References Cited

U.S. PATENT DOCUMENTS

2006/0009899 A1 1/2006 Streib
2018/0149101 A1 5/2018 Watanabe et al.
2020/0079389 A1 3/2020 Asano et al.
2022/0118967 A1 4/2022 Sasade et al.
2025/0058644 A1* 2/2025 Oh ............................ B60L 7/18

FOREIGN PATENT DOCUMENTS

DE 10 2004 031 312 A1 2/2006
DE 10 2015 219 181 A1 4/2017
DE 10 2017 221 369 A1 5/2018
DE 11 2018 001 002 T5 11/2019
DE 10 2018 130 051 A1 5/2020
DE 10 2021 117 960 A1 1/2023
JP 2001-347851 A 12/2001

OTHER PUBLICATIONS

German-language Written Opinion (PCT/ISA/237) issued in PCT Application No. PCT/EP2023/079394 dated Jan. 24, 2024 with English translation (6 pages).
German language Search Report issued in German Application No. 10 2022 128 356.9 dated May 17, 2023 with partial English translation (12 pages).

* cited by examiner

METHOD FOR CONTROLLING A LONGITUDINAL ACCELERATION DURING AND ASSISTING OPERATION OF A DRIVER ASSISTANCE SYSTEM IN A MOTOR VEHICLE, CONTROLLER UNIT AND MOTOR VEHICLE HAVING SUCH A CONTROLLER UNIT

BACKGROUND AND SUMMARY

The invention relates to a method for controlling longitudinal acceleration with an active driver assistance system in a motor vehicle that has an automatic transmission. The invention also relates to a control unit configured to execute the method for controlling the longitudinal acceleration. The method further relates to a motor vehicle equipped with such a control unit. Moreover, the invention relates to a computer program containing commands with which the control unit executes the steps of the method, and a computer-readable memory on which the program is stored.

Modern motor vehicles have increasingly more driver assistance systems. These driver assistance systems help the operator or driver of the motor vehicle execute driving tasks, e.g. establishing and/or maintaining a distance to other vehicles, establishing and/or maintaining a (current) speed, etc. When the driver assistance system helps a driver, accelerations and/or decelerations may require the automatic transmission to change gears. This automatic transmission may contain a hydrodynamic torque converter, a dual-clutch transmission, or an automated manual transmission (with just one clutch). When changing gears while driving in the assisted mode of the driver assistance system, acceleration is currently interrupted when shifting up, or there is a moment of increased acceleration when shifting down, and these disruptions in the acceleration are interpreted by a longitudinal acceleration regulator in the motor vehicle as disruption values.

With a conventional upshifting during the assisted mode, resulting in large jump in gear ratios (e.g. from first to second gear, or second to third gear), a brief acceleration interruption occurs due to a torque interruption in the motor (internal combustion engine) demanded by the electronic transmission control. The longitudinal acceleration regulator attempts to compensate for this interruption by increasing the torque applied to the wheels. Because of this torque interruption, the longitudinal acceleration regulator is unable to apply the necessary torque to the wheels. The necessary wheel torque is first obtained after the rotational rates have been synchronized in the transmission, and the torque interruption has been overcome. Because the longitudinal acceleration regulator demands a higher wheel torque during the torque interruption, excessive drive torque, or wheel torque is demanded for the present driving situation, resulting in a noticeable jolt after switching gears. FIG. 3, in which the prior art is illustrated, shows how an undesired shifting jolt R takes place when upshifting in the conventional manner in a graph illustrating the wheel torque/time curve obtained with the prior art.

During normal driving operation, i.e. when the driver assistance system for controlling longitudinal acceleration is not in use, the drive torque or motor torque resulting from upshifting obtained with the acceleration pedal is such that the resulting wheel torque is reduced when the higher gear is engaged. Consequently, after the torque interruption during the rotational rate synchronization during the shifting process, the motor torque is reduced, resulting in a harmonious torque curve. The jolt does not occur during normal driving due to the gear-dependent torque, for which reason drivers or passengers in a motor vehicle notice the jolt that occurs when the driver assistance longitudinal acceleration system is in use. This is unpleasant for a driver, who is then less likely to want to use the driver assistance longitudinal acceleration system. The use of systems that provide safety functions, in particular by helping maintain a safe distance to other vehicles, would, however, improve traffic safety. DE 199 16 655 A1 discloses a method for controlling a drive unit in a motor vehicle in which the torque from the drive unit is acted on as a means of reducing fluctuations in rotational rates, although this does not take place when shifting gears. This acting on the torque from the drive unit to reduce rotational rate fluctuations is restored after detecting an extreme in the rotational rate curve.

DE 10 2017 221 369 A1 discloses a shifting control system that can reduce jolts. A target torque sensor sets a target torque for an internal combustion engine based on acceleration. An actual torque sensor calculates an actual torque from the internal combustion engine during the inertia phase. A regulator calculates an integrated value for the difference between the target torque and the actual torque starting at the beginning of the inertia phase, and ending at a predetermined time prior to completion of the inertia phase, and corrects the target torque in the time remaining before completion of the inertia phase.

An objective of the invention is to be able to shift gears with an automatic transmission using a driver assistance system in a motor vehicle with very little, ideally no, jolting.

This problem is addressed by the subject matter of the independent claims. Other embodiments of the invention are disclosed in the dependent claims, the description, and the drawings. Features, advantages and possible designs explained in the framework of the description for any of the subject matter in the independent claims are to be regarded categorically and comprehensively as features, advantages, and possible embodiments of the respective subject matter of the other independent claims, as well as any possible combinations of the subject matter of the independent claims, potentially in conjunction with one or more of the dependent claims.

The invention proposes a method for controlling longitudinal acceleration with an active driver assistance system in a motor vehicle that has an automatic transmission. The invention also proposes a control unit configured to execute the method described herein, i.e. one, some, or all of the steps of the method. The invention also proposes a motor vehicle, in particular a passenger automobile and/or truck, that contains such a control unit. Specifically, this control unit is part of a central vehicle management system (CVM). The control unit is configured for electronic data processing. The invention also relates to a computer program for the control unit that contains commands with which the steps of the method are executed. Because the control unit executes or processes the computer program, or its commands, these initial control commands characterized the steps of the method, and the initial control commands are accepted by the mechanisms in the motor vehicle (in particular the drive mechanisms and transmission, etc.) as initial control commands. The invention also relates to a computer-readable memory, i.e. a data storage medium, on which the computer program is stored. On the whole, the CVM is configured to execute the method for controlling longitudinal acceleration described herein. The CVM is also configured to control, and/or regulate, and/or provide other motor vehicle functions, e.g. driver assistance system functions such as adaptive cruise control (ACC), with which vehicle speed is adjusted to maintain a safe distance from vehicles ahead. The CVM thus makes the driver assistance available when a user or driver of the motor vehicle activates the driver assistance system function in question, e.g. the ACC function. When in this assisted mode, the motor vehicle, in particular the driver assistance system function in the CVM, controls the vehicle speed, and therefore the acceleration (acceleration and deceleration) of the motor vehicle, among other things. To obtain a particularly efficient operation of an internal combustion engine in the motor vehicle in the driver assistance mode, it may be necessary to shift gears, i.e. to a higher or lower gear.

With the method, a shift initiation signal indicating an upcoming shifting of gears is first detected, which establishes the time at which the shifting is to take place, and a synchronization function for a continuing time value is provided. In other words, the need for upshifting (shifting to a higher gear) or downshifting (shifting to a lower gear) due to the current driving situation is detected. The shift initiation signal thus indicates that the transmission needs to shift gears. The initiation of the shifting process is determined when the shift initiation signal is received. This also starts a timer that indicates when synchronization needs to take place. This shift initiation signal thus forms an event defining the time at which shifting is to be initiated, and when the timer is to be started.

In addition, a current actual wheel torque is detected at a drive wheel for the motor vehicle at the starting point for the shifting process. This can be obtained by modelling a motor torque obtained with a motor control unit, and then calculating the actual wheel torque from all of the gear ratios between the drive shaft or crankshaft in the motor, or internal combustion engine, and the drive wheel. This could also be determined with a wheel torque sensor. The current wheel torque can be determined independently of the shift initiation signal (e.g. continuously), in which case the time at which the shifting process is initiated is drawn on. It is also conceivable to detect the actual wheel torque when determining the point at which the shifting is to be initiated.

A maximum target wheel torque is then determined at the time when shifting is initiated, e.g. directly after, or at the same time the start of the shifting process has been detected, by adding the detected actual wheel torque and a first predefined wheel torque offset value. Furthermore, a minimum target wheel torque is determined at the when shifting is initiated, e.g. directly after, or at the same time the start of the shifting process has been detected, by adding a target wheel torque obtained from a longitudinal acceleration regulator (which can also be referred to as an ax-regulator) and a second predefined wheel torque offset value. The (mathematical) amounts for the wheel torque offset values differ. These wheel torque offset values may differ substantially.

The target wheel torque obtained from the longitudinal acceleration regulator is composed of an input part and a control part. The input part is obtained from a target acceleration demanded by the driver and/or the driver assistance system function in the CVM system. If the target acceleration and the actual acceleration differ, this is detected by the longitudinal acceleration regulator, or $a_x$-regulator, and a corresponding control part is obtained with which the actual acceleration can best be synchronized with the target acceleration. In other words, the longitudinal acceleration regulator provides a higher wheel torque by increasing the control part if the longitudinal acceleration regulator detects that the actual acceleration is less than the target acceleration. In this regard, the longitudinal acceleration regulator provides a lower target wheel torque by lowering the control part, if it has been detected that the actual acceleration is higher than the target acceleration.

The first wheel torque offset value and/or second wheel torque offset value can be fixed values. Furthermore, the first and/or second wheel torque offset values can be defined prior to, at the same time as, or after detecting the starting time for the shifting. In particular, part of the method is defining the first and second wheel torque offset values, e.g. by obtaining the respective wheel torque offset values from a memory.

A difference between the target wheel torque obtained from the longitudinal acceleration regulator and the minimum target wheel torque is also determined. The torque difference is continuously reduced based on the time value obtained from the timer using the synchronization function. A synchronization point is defined after starting the shifting. resulting in a synchronization period between starting the shifting and the point at which synchronization is obtained. The minimum target wheel torque is continuously reduced during the synchronization period, until the torque difference at the time of synchronization is zero.

A target drive torque is obtained during the synchronization period, which allows the actual wheel torque to only increase to the maximum target wheel torque, and also allows the actual wheel torque to only decrease to the minimum target wheel torque. This means that at this point in the method, initial control signals are issued with which the drive mechanism in the motor vehicle, which contains an internal combustion engine and/or an electric drive motor, can be controlled such that the actual wheel torque remains between the minimum target wheel torque and the maximum target wheel torque.

By continuously reducing the torque difference, an abrupt or jolting increase in the actual wheel torque to the target wheel torque is prevented. Consequently, passengers do not notice an undesirable jolting due to acceleration when in the assistance mode.

In another possible embodiment, the synchronization time is defined such that the synchronization period lasts between 1.5 and 3 seconds, in particular 2 seconds. The synchronization obtained between 1.5 and 3 seconds after initiating shifting results in a particularly harmonious reduction in the torque difference, and consequently a particularly efficient prevention of longitudinal jolts. The synchronization time and the synchronization period could also be defined on the basis of the difference in gear ratios that characterizes the changes in gear ratios caused by the shifting from one to another. By way of example, when shifting from first to second gear, the synchronization period, and therefore the synchronization time, differs from that when shifting from third to fourth gear.

With another embodiment, the first wheel torque offset value is between 15 Nm (Newton-meter) and 50 Nm, in particular 25 Nm. The second wheel torque offset value can be between 400 Nm and 800 Nm, in particular 600 Nm. These ranges, or values, have proven to be particularly advantageous with regard to efficiently preventing longitudinal jolts.

The first wheel torque offset value and/or second wheel torque offset value are defined, potentially as a result of training, on the basis of a value that characterizes this change in ratios, caused by the shifting of gears. In other words, a different torque offset value can be obtained for a first value for the change in gear ratios than for the second value for the change in gear ratios. By way of example, when shifting from first to second gear, a different first wheel torque offset value is obtained than when shifting from third to fourth gear. The same applies to the second wheel torque offset value. Consequently, a specific, dedicated torque offset value can be used for each shifting, which applies precisely to the requirements for preventing longitudinal jolts for each change in gear ratios, i.e. shifting from one gear to another.

In another embodiment, the first predefined wheel torque offset value for shifting to a higher gear has a positive value. The second predefined wheel torque offset value for shifting to a higher gear can have a negative value. When shifting from first to second gear, the above, purely exemplary, values apply:

First wheel torque offset value=25 Nm, and second wheel torque offset value=−600 Nm.

This means that the maximum target wheel torque value is 25 Nm more than the actual wheel torque value detected at the start of the shifting, while the minimum target wheel torque value is 600 Nm less than the target wheel torque value detected at the start of the shifting process.

The method can be used for upshifting and/or downshifting. When downshifting, the first predefined wheel torque offset value is negative, and the second predefined wheel torque offset value for shifting to a lower gear is positive.

Other features of the invention can be derived from the claims, drawings, and descriptions of the drawings. The features specified above and combinations thereof, as well as features and combinations thereof specified below in the drawings and descriptions thereof can be used not only in the given combinations, but also in other combinations or in and of themselves, without abandoning the scope of the invention.

BRIEF DESCRIPTION OF THE DRAWINGS

The same and functionally identical elements shown in the drawings have the same reference symbols.

DETAILED DESCRIPTION

A method for controlling longitudinal acceleration with an active driver assistance system in a motor vehicle that has an automatic transmission and a control unit for the motor vehicle is explained below. The steps of the method represent code, or commands, in a computer program, with which the control unit, an electronic data processing unit, or programmable control unit in a motor vehicle, executes the method. In other words, the computer program is a control program for the control unit. The control unit controls/regulates the motor vehicle, in particular a drive unit in the motor vehicle. This means that when executing or processing the computer program, the control unit issues initial control commands that characterize the steps of the method, such that the drive unit is controlled and/or regulated by the steps, or carries out these steps. The computer program is stored, for example, on a computer-readable memory.

Figure 1:
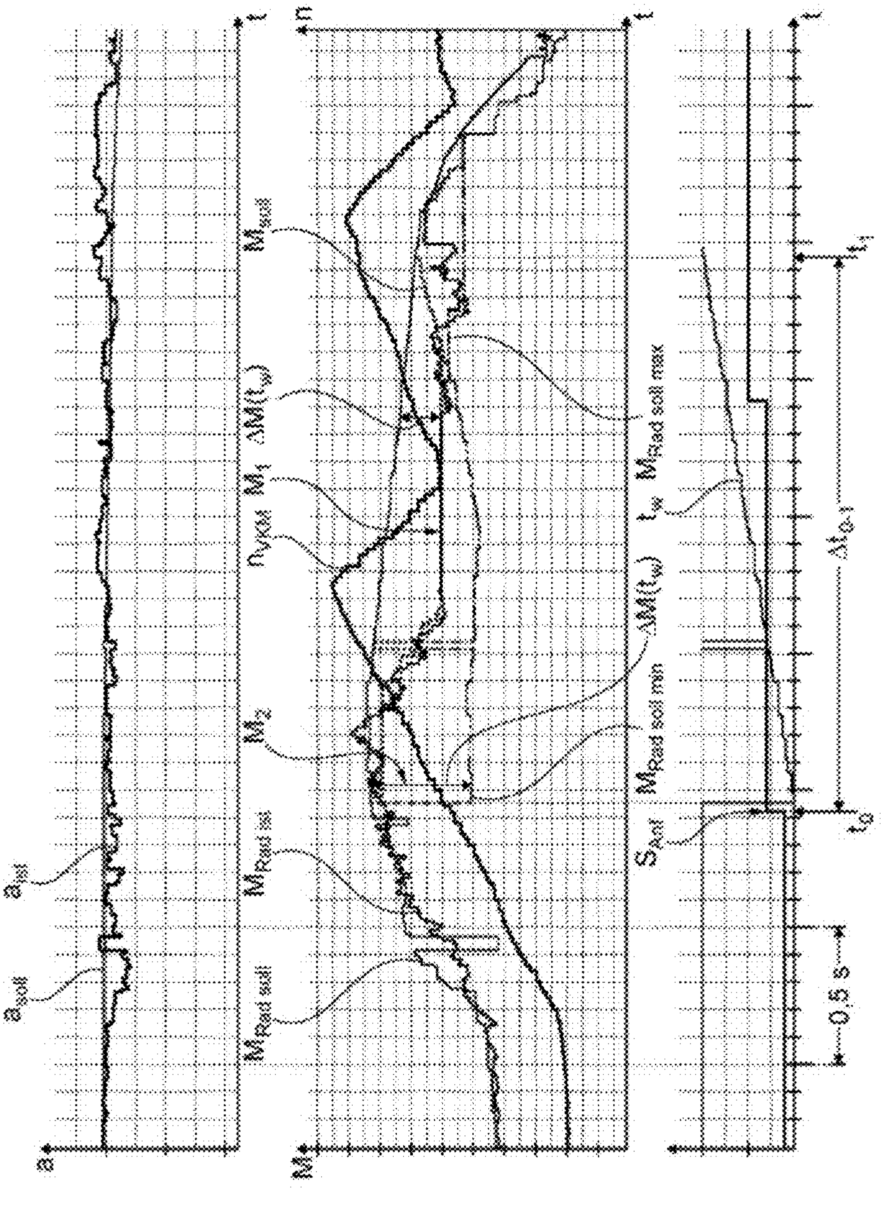
FIG. 1 shows, to illustrate a method for controlling a longitudinal acceleration when in the assisted mode of a driver assistance system, a respective curve for a target and an actual vehicle acceleration value, a target and an actual wheel torque value, a minimum target wheel torque value and a maximum target wheel torque value, a target drive torque, a rotational rate for an internal combustion engine, and a time value, all over the same time axis.

FIG. 1 shows, to illustrate a method for controlling a longitudinal acceleration when in the assisted mode of a driver assistance system, a respective curve for a target vehicle acceleration value $a_{soll}$ and an actual vehicle acceleration value $a_{ist}$, a target wheel torque value $M_{Rad\ soll}$ and an actual wheel torque value $M_{Rad\ ist}$, a minimum target wheel torque value $M_{Rad\ soll\ min}$, and a maximum target wheel torque value $M_{Rad\ soll\ max}$, a target drive torque $M_{soll}$, and a rotational rate $n_{VKM}$ for an internal combustion engine, and a time value $t_w$, over the same time axis t.

The method shall be described below for shifting from first to second gear. The method can also be used for other shifting processes, i.e. for upshifting and/or downshifting between other gears.

For this, a shift initiation signal $S_{Anf}$ that characterizes an upcoming shift in gears is first obtained, which defines a starting point $t_0$ for the shifting process, and a timer is started. The timer provides a synchronization function for the continuously increasing time value $t_w$ over time t. In addition, the current actual wheel torque value $M_{Rad\ ist}$ for a current actual wheel torque (i.e. at the starting point to of the shifting process) at a drive wheel for the motor vehicle is detected at the starting point to of the shifting process. The maximum target wheel torque value $M_{Rad\ soll\ max}$ is also determined at the starting point to by adding the detected actual wheel torque value $M_{Rad}$ ist and a first predefined wheel torque offset value $M_1$. The minimum target wheel torque value $M_{Rad\ soll\ min}$ is also obtained by adding the target wheel torque value $M_{Rad\ soll}$ obtained with a longitudinal acceleration regulator and a second predefined wheel torque offset value $M_2$. In the present example, the first wheel torque offset value $M_1$ is 25 Nm (because of the scale used in FIG. 1, $M_1$ cannot be seen; because of the thickness of the line, $M_1$ is concealed by the line for the actual wheel torque value $M_{Rad\ ist}$). Furthermore, the first predefined wheel torque offset value $M_1$ is positive. The second predefined wheel torque offset value $M_2$ is 600 Nm in this example, and is negative. The first and/or second wheel torque offset values $M_1$ and $M_2$ could be defined on the basis of the value for the change in gear ratios that characterizes the change in gear ratios resulting from shifting gears.

A value ΔM for the difference between the target wheel torque value $M_{Rad\ soll}$ and the minimum target wheel torque value $M_{Rad\ soll\ min}$ is also obtained in the method. The synchronization function continuously reduces the torque difference value ΔM in relation to the time value $t_w$ indicated by the time—the time value $t_w$ increases over time t, starting at the beginning to of the shifting process, while the difference between the target wheel torque value $M_{Rad\ soll}$ and the minimum target wheel torque value $M_{Rad\ soll\ min}$ decreases, due to the effect of the synchronization function. The torque difference value ΔM, or its reduction, is thus a function of time t or the time value $t_w$. A synchronization point $t_1$ following the shifting initiation point $t_0$ is predefined, resulting in a synchronization period $\Delta t_{0-1}$, which lasts from the shifting initiation point to until the synchronization point $t_1$. The minimum target wheel torque value amount $|M_{Rad\ soll\ min}|$ decreases continuously during the synchronization period $\Delta t_{0-1}$, until the torque difference value ΔM at the synchronization point to is zero. The torque difference value ΔM, or its reduction is therefore not only a function of time t, or the time value $t_w$, but also of the synchronization period $\Delta t_{0-1}$, i.e. it is a function of the time from the shifting initiation point $t_0$ to the synchronization point $t_1$.

The target drive torque value Moon is obtained during the synchronization period $\Delta t_{0-1}$, which allows the actual wheel torque value $M_{Rad\ ist}$ to increase to no more than the maximum target wheel torque value $M_{Rad\ soll\ max}$, and only decrease to the minimum target wheel torque value $M_{Rad\ soll\ min}$. The synchronization point is defined in the present case such that the synchronization period $\Delta t_{0-1}$ i lasts for 2 seconds.

Figure 2:
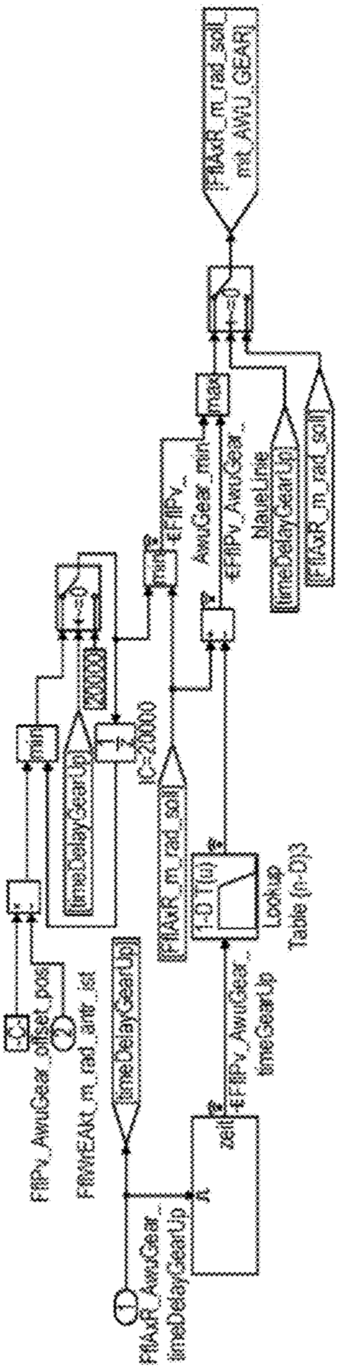
FIG. 2 shows a regulating model for the method.
Figure 3:
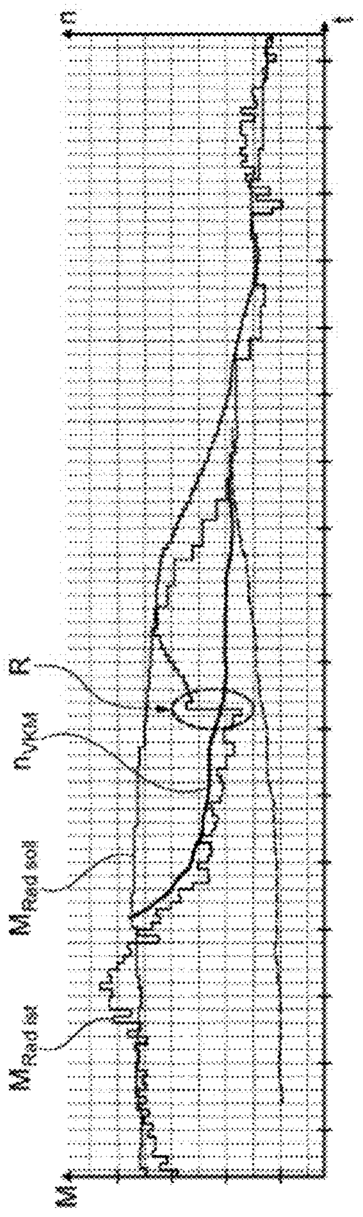
Fig. 3 (Prior Art)
FIG. 3 shows an undesired shifting jolt that occurs with conventional shifting, to illustrate the problem with the prior art.

A control model that characterizes the method is illustrated in FIG. 2, which is generated by modeling software (in this case, Matlab Simulink) for creating a model of the physical system.

The fundamental idea of the invention is that within a parameterized period of time after identifying the need to upshift, the wheel torque is reduced due to the torque interruption, and a "torque cover" is obtained by adding a parameterized torque offset to an earlier actual wheel torque to get a minimum value. This prevents an abrupt jolt in the actual target wheel torque following the torque interruption. The torque cover is continuously returned to the actual target wheel torque determined by the CVM regulator with a maximum value obtained from a negative torque offset to the target wheel torque as a function of the time value.

As a concrete example of FIG. 2, the timer FflPv_AwuGear-timeGearUp is started when shifting from first to second gear is detected. When the timer is started, a minimum value is obtained by adding the applicable offset FfflPv_AwuGear_offset_pos (25 N m in this example) with the actual earlier value to the actual wheel torque FflWrEAkt_m_rad_antr_ist. Consequently, FflPv_AwuGear_min covers the target wheel torque, indicated in the control model, or in FIG. 2, by FflAxR_m_rad_soll_mit_AWU_GEAR. The cover is continuously drawn upward by a negative offset obtained with the timer to the target wheel torque FflAxR_m_rad_soll over time t, in order for the target drive torque to return to the actual target wheel torque via the FfiPy_AwuGear_blaueLinie.

LIST OF REFERENCE SYMBOLS $a_{ist}$ actual vehicle acceleration value
$a_{soll}$ target vehicle acceleration value
$M_1$ first wheel torque offset value
$M_2$ second wheel torque offset value
$M_{Rad\ ist}$ actual wheel torque value
$M_{Rad\ soll}$ max maximum target wheel torque value
$M_{Rad\ soll\ min}$ minimum target wheel torque value
$M_{Rad\ soll}$ target wheel torque value
$M_{soll}$ target drive torque
$n_{VKM}$ rotational rate
R shifting jolt
$S_{Anf}$ shift initiation signal
t time
$t_0$ shifting starting point
$t_1$ synchronization point
$t_w$ time value
$\Delta M$ torque difference value
$\Delta M(t_w)$ torque difference value as a function of the time value (see FIG. 1)
$\Delta t_{0-1}$ synchronization period

The invention claimed is:

1. A method for controlling a longitudinal acceleration with an active driver assistance system in a motor vehicle that has an automatic transmission, the method comprising:

detecting a shift initiation signal that characterizes an upcoming gear shifting, with which a shifting starting point is defined, and a synchronization function is assigned a progressive time value;

detecting, at a shifting initiation point, a current actual wheel torque value;

obtaining a maximum target wheel torque value by adding a first predefined wheel torque offset value to this detected current actual wheel torque value;

obtaining a minimum target wheel torque value by adding a second predefined wheel torque offset value to a target wheel torque value obtained from a longitudinal acceleration regulator;

continuously reducing a torque difference value for the difference between the target wheel torque value obtained from the longitudinal acceleration regulator and the minimum target wheel torque value by the synchronization function based on the progressive time value over a synchronization period between the shifting initiation point and a predefined synchronization point, in that a minimum target wheel torque value amount is continuously reduced, until the torque difference value at the predefined synchronization point is zero;

wherein a target drive torque value is obtained during the synchronization period, which:

allows an increase in the current wheel torque value to no more than the maximum target wheel torque value, and only allows a decrease in the current wheel torque value to the minimum target wheel torque value.

2. The method according to claim 1, wherein the predefined synchronization point is defined such that the synchronization period lasts between 1.5 seconds and 3 seconds.

3. The method according to claim 1, wherein the first predefined wheel torque offset value is 15 N m to 50 N m.

4. The method according to claim 1, wherein the second predefined wheel torque offset value is 400 N m to 800 N m.

5. The method according to claim 1, wherein at least one of the first predefined wheel torque offset value or the second predefined wheel torque offset value is defined on the basis of a difference in gear ratios that characterizes the changes in gear ratios caused by the shifting of gears.

6. The method according to claim 1, wherein the first predefined wheel torque offset value is positive when shifting to a higher gear.

7. The method according to claim 1, wherein the second predefined wheel torque offset value is negative when shifting to a higher gear.

8. A control unit for a motor vehicle configured to execute the steps in the method according claim 1.

9. A motor vehicle that has the control unit according to claim 8.

10. A control unit for a motor vehicle, configured to execute computer program containing commands for controlling a longitudinal acceleration with an active driver assistance system in the motor vehicle that has an automatic transmission, the computer program causing the controller to:

detect a shift initiation signal that characterizes an upcoming gear shifting, with which a shifting starting point is defined, and a synchronization function is assigned a progressive time value;

detect, at a shifting initiation point, a current actual wheel torque value;

obtain a maximum target wheel torque value by adding a first predefined wheel torque offset value to this detected current actual wheel torque value;

obtain a minimum target wheel torque value by adding a second predefined wheel torque offset value to a target wheel torque value obtained from a longitudinal acceleration regulator;

continuously reduce a torque difference value for the difference between the target wheel torque value obtained from the longitudinal acceleration regulator and the minimum target wheel torque value by the synchronization function based on the progressive time value over a synchronization period between the shifting initiation point and a predefined synchronization point, in that a minimum target wheel torque value amount is continuously reduced, until the torque difference value at the predefined synchronization point is zero, wherein a target drive torque value is obtained during the synchronization period, which:

allows an increase in the current wheel torque value to no more than the maximum target wheel torque value, and only allows a decrease in the current wheel torque value to the minimum target wheel torque value.

* * * * *